(12) United States Patent
Lang et al.

(10) Patent No.: US 11,558,434 B2
(45) Date of Patent: *Jan. 17, 2023

(54) CALL PROTECT GEOLOCATOR DISPLAY FOR 5G OR OTHER NEXT GENERATION NETWORK

(71) Applicant: AT&T Intellectual Property I, L.P., Atlanta, GA (US)

(72) Inventors: Howard L. Lang, Wayside, NJ (US); Muhammad Taufiq Ansari, Des Plaines, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/199,310

(22) Filed: Mar. 11, 2021

(65) Prior Publication Data

US 2021/0203701 A1    Jul. 1, 2021

Related U.S. Application Data

(63) Continuation of application No. 16/685,239, filed on Nov. 15, 2019, now Pat. No. 10,979,464.

(51) Int. Cl.
| | |
|---|---|
| *H04W 12/02* | (2009.01) |
| *H04L 65/1076* | (2022.01) |
| *H04M 3/42* | (2006.01) |
| *H04W 4/02* | (2018.01) |
| *H04L 65/1104* | (2022.01) |

(52) U.S. Cl.
CPC ...... *H04L 65/1079* (2013.01); *H04L 65/1104* (2022.05); *H04M 3/42034* (2013.01); *H04W 4/02* (2013.01); *H04W 12/02* (2013.01)

(58) Field of Classification Search
CPC . H04L 65/1079; H04L 65/1104; H04L 65/80; H04L 65/1069; H04M 3/42034; H04M 2203/6027; H04M 2207/185; H04M 2242/30; H04M 3/42042; H04M 3/42348; H04M 3/436; H04W 4/02; H04W 12/02; H04W 4/023; H04W 12/06; H04W 12/63
See application file for complete search history.

(56) References Cited

U.S. PATENT DOCUMENTS

| | | |
|---|---|---|
| 6,353,664 B1 | 3/2002 | Cannon et al. |
| 10,778,841 B2 | 9/2020 | Scivicque |
| 10,979,464 B1 * | 4/2021 | Lang .................. H04L 65/1069 |

(Continued)

OTHER PUBLICATIONS

Office Action dated Sep. 25, 2020 for U.S. Appl. No. 16/685,239, 37 pages.

*Primary Examiner* — Julio R Perez
(74) *Attorney, Agent, or Firm* — Amin, Turocy & Watson, LLP

(57) ABSTRACT

Call spoofing can be mitigated by providing geolocation information to the called device. For example, when a call rings, a geolocator can be invoked and the incoming call display screen can show a carrier logo and/or a geolocator globe illustrating the location of the call originator. The geolocation session initiation protocol data can be confirmed by a network device and compared against carrier specific data of the calling device to authenticate voice calls for called devices. In one embodiment location data of the calling device can purposely be shared in order to facilitate the mitigation of call spoofing.

20 Claims, 10 Drawing Sheets

(56) References Cited

U.S. PATENT DOCUMENTS

| | | | |
|---|---|---|---|
| 11,218,591 B1 * | 1/2022 | Lang | H04M 3/436 |
| 2010/0317368 A1 | 12/2010 | Augst et al. | |
| 2011/0092228 A1 | 4/2011 | Chen | |
| 2020/0028690 A1 | 1/2020 | Barakat et al. | |

* cited by examiner

CALL PROTECT GEOLOCATOR DISPLAY FOR 5G OR OTHER NEXT GENERATION NETWORK

RELATED APPLICATION

The subject patent application is a continuation of, and claims priority to, U.S. patent application Ser. No. 16/685,239 (now U.S. Pat. No. 10,979,464), filed Nov. 15, 2019, and entitled "CALL PROTECT GEOLOCATOR DISPLAY FOR 4G, 5G OR OTHER NEXT GENERATION NETWORK," the entirety of which application is hereby incorporated by reference herein.

TECHNICAL FIELD

This disclosure relates generally to facilitating spam and/or spoofed call reduction for voice calls. For example, this disclosure relates to facilitating a call protect geolocator display for a 4G, 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a call protect geolocator display is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
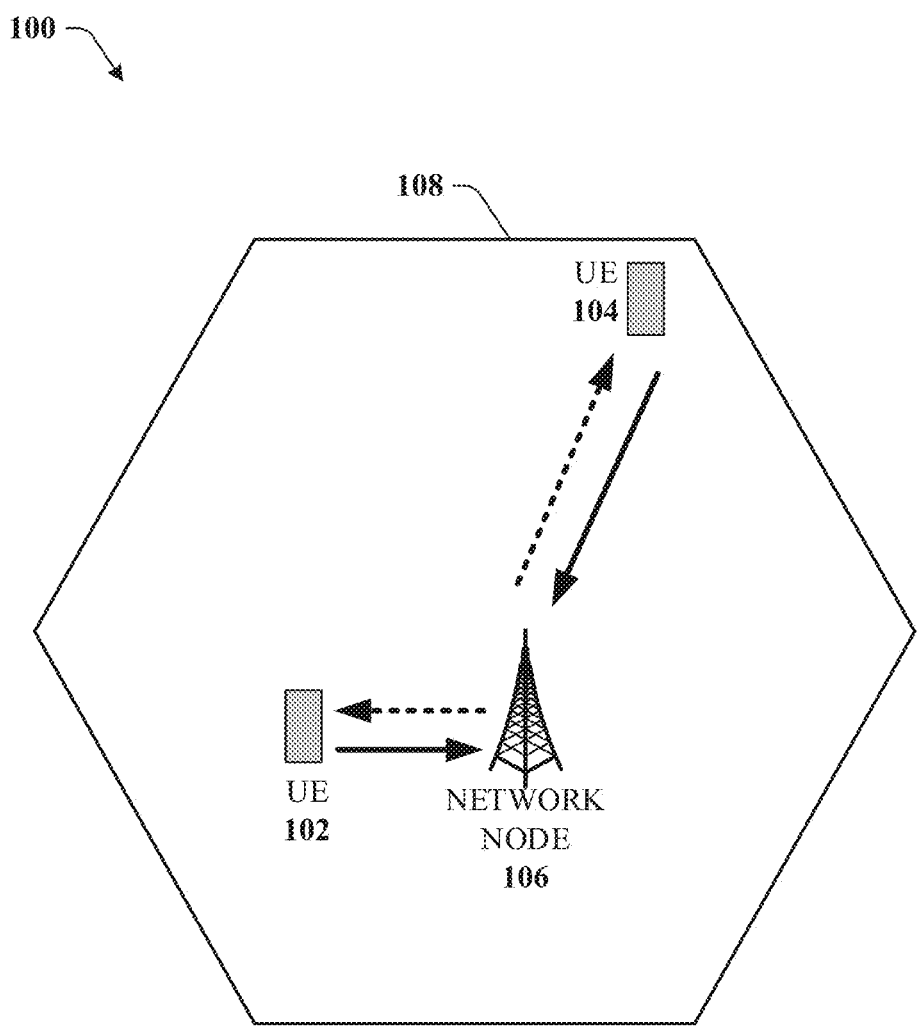
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a call protect geolocator display for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate a call protect geolocator display for a 5G network. Facilitating a call protect geolocator display for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A geolocation-session initiation protocol (SIP) feature can be added to a SIP header and a geolocation-http for location conveyance can provide additional consumer protection both when initiating and receiving a call. For incoming business and consumer digital phone and voice over LTE calls, the recipient can be provided with the approximate location of the calling party to defend against unwanted/spoofed calls, and also to provide additional assurance that persons (e.g., children, grandparents, etc.) have arrived at their proper destination. For outgoing calls, the feature can provide assurance that the call originated from the stated location, and provide assurance to parents/guardians of the caller's location.

Robocalling and neighbor spoofing often occur when the calling party pretends to be in a geographic location that they are not. This disclosure provides a verified call origination location. Location accuracy can be set by a user preference. Parents and/or family members can verify the location of minor children when a call is placed or received. Additionally, this disclosure can facilitate trust with calls originated from large and small corporate businesses, call centers, doctors, entertainment industries, hospitals, insurance agents, and other service and manufacturing industries.

Many cellular geolocation systems use a global positioning system (GPS) and work within a single operating environment, such as Apple iOS. As a network service, this system can work across mobile device platforms by using geolocation session initiation protocol (SIP) and/or geolocation-http location conveyance for SIP. Additional caller verification functionality, such as the emerging secure telephony identity revisited (STIR), and/or secure handling of asserted information using tokens (SHAKEN) standards, can assure that the SIP information is not spoofed.

The purpose of this disclosure is to provide a defense against robocalling, neighbor spoofing, and family protection. When a call rings a geolocator can be invoked and the incoming call display screen can show a carrier logo and/or a geolocator spinning globe icon illustrating the location of the call originator. The mobile application can receive a 3GPP location conveyance information from geolocation-SIP and geolocation-http parameters.

The geolocator application can comprise a two-fold requirement: 1) find location using subscriber location information from SIP registration, and 2) display it on a geolocator globe. The application can simultaneously receive the locations of both the calling and the called party.

A mobility subscriber family of four living in the same household in Chicago area can have similar numbers. When the daughter calls her Father from Chicago to Chicago, the mobile application can show call origination from Chicago, and the mobile application can verify the location of both the calling and the called parties. If the daughter's number is spoofed the number shown by the geolocator might display "Houston" or another country. However, since the father knows that his daughter is in the school and can't call from Houston, the father can decide not to pick up the call.

For digital, carrier voice over internet protocol (CVOIP), business voice over internet protocol (BVOIP) phone originated to mobile terminated calls, digital phone subscriber information can be retrieved through session initiation protocol (SIP), secure telephony identity revisited (STIR), and/or secure handling of asserted information using tokens (SHAKEN) and can be displayed on the geolocator application of the mobile phone. STIR/SHAKEN can leverage digital certificates, based on a public key cryptography, to determine that the calling number is authentic and not spoofed. For businesses calling back customers from a trunk number, such as an Apple call back with the Apple outbound trunk number, the geolocator application can determine the actual locations of the call and can display the location on the geolocator globe. For call centers that handle dozens or hundreds of customers and may need to call them back, the geolocator application can determine the actual locations of the calling party and display on the geolocator globe.

In one embodiment, the geolocator globe can spin while the application retrieves the location information of the mobile subscriber from the SIP initial registration information. The globe can stop and focus on the point of call of origination. A network-based service can identify unwanted calls such as fraud, spam, and/or unwanted political campaign calls. Once these calls are identified, they can be categorized. After the categorization has taken place, there can be various dispositions for the call such as block the call, allow the call, send the call to voicemail, place a warning label on the call, etc. STIR/SHAKEN can apply a digital signature from an originating caller. This information can verify that call did indeed originated on a specific service provider's network as opposed to a call that has been spoofed to pretend it has an original number associated with it. Within a SIP registration, the location of a mobile device can be registered as an entity to help determine the mobile device's location. Thus, geolocation can be utilized in accordance with the SIP. This data can then be sent to third-party devices if a user of the mobile device opts to share his/her location data with the third-party. For example, whereas the STIR/SHAKEN can determine that a call originated from a specific service provider, the SIP registration can determine that a call is coming from a specific location, a type of phone, a corporate location associated with the telephone number of the mobile device. For example, if a user identity of the originating call opts in to share his/her location, then the STIR/SHAKEN can validate the authenticity of that location (based on the SIP) of the originating device for the terminating device. If the location is not validated, then the system can reject the call such that it never is received by the terminating device or it can provide a user identity of the terminating device with the information that the location is not confirmed and allow the user identity of the terminating device to determine if he/she would like to accept/reject the call. Whether the call is automatically preempted, or the user identity is provided with the option to answer can be a function of a setting within the mobile application itself, such that the user identity can select how the system should function prior to a call attempt.

In one embodiment, a geolocation application can be downloaded to a mobile phone such that the location information associated an initiating mobile device, that is initiating a call with the mobile phone, is displayed on the mobile phone via the application. The more information a person has about a user identity associated with the initiating device, the more likely that person is to actually answer the call. Additionally, other data can be displayed such as the business name, a relationship of the calling party to the called party (e.g., service provider, family member, type of business, etc.) In another embodiment, if someone wanted to know the location of their family member, the application can determine the location of the family member. In another embodiment, if a business has remote employees, then the location of the address of the business can be displayed even if a remote employee is geographically remote to the business itself. The geolocation itself can be sent via hypertext transfer protocol (HTTP) if the originating caller is using Wi-Fi calling and/or a wireless call signal has failed between the originating and the terminating devices.

In one embodiment, described herein is a method comprising facilitating, by a first mobile device comprising a processor, receiving an indication of an incoming call from a second mobile device. In response to the receiving the indication, the method can comprise determining, by the first mobile device, first location data representative of a first location of the first mobile device. Additionally, in response to the determining the first location data, the method can comprise determining, by the first mobile device, second location data representative of a second location of the second mobile device. Furthermore, in response to the determining the second location data, the method can comprise facilitating, by the first mobile device, a communication between the first mobile device and the second mobile device.

According to another embodiment, a system can facilitate receiving first location data representative of a first location of a first mobile device of a wireless network. They system can comprise receiving second location data representative of a second location of a second mobile device of the wireless network. Furthermore, in response to the receiving the first location data and the second location data, the system can comprise sending the second location data to the first mobile device to facilitate a communication between the first mobile device and the second mobile device, wherein the communication is a voice call between the first mobile device and the second mobile device.

According to yet another embodiment, described herein is a machine-readable medium that can perform the operations comprising receiving first global position system data representative of a first location of a first mobile device of a wireless network. The machine-readable medium can perform the operations comprising receiving second global position system data representative of a second location of a second mobile device of the wireless network. In response to the receiving the first global position system data and the second global position system data, the machine-readable medium can perform the operations comprising sending the second global position system data to the first mobile device. Additionally, in response to the sending the second global position system data to the first mobile device, the machine-readable medium can perform the operations comprising facilitating a wireless voice connection between the first mobile device and the second mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity.

Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

For mobile to mobile calls, a geolocation header field can be added to the in the SIP header to acquire location information as per the 3GPP guidelines. Business VOIP phones using the SIP interface can register the location presence using the geolocation in the SIP header field. When a call is originated by these business to the VOLTE phones, the location information can be sent to the UE 102 and can be displayed in the native dialer for 4G network and use the geolocator app on 5G network. A geolocation-http can also be used if the requesting party supports the http GET to acquire location information. A connection can be facilitate from the BVOIP network customer to the UE 102 using the network interface to IMS core to the UE.

Figure 2:
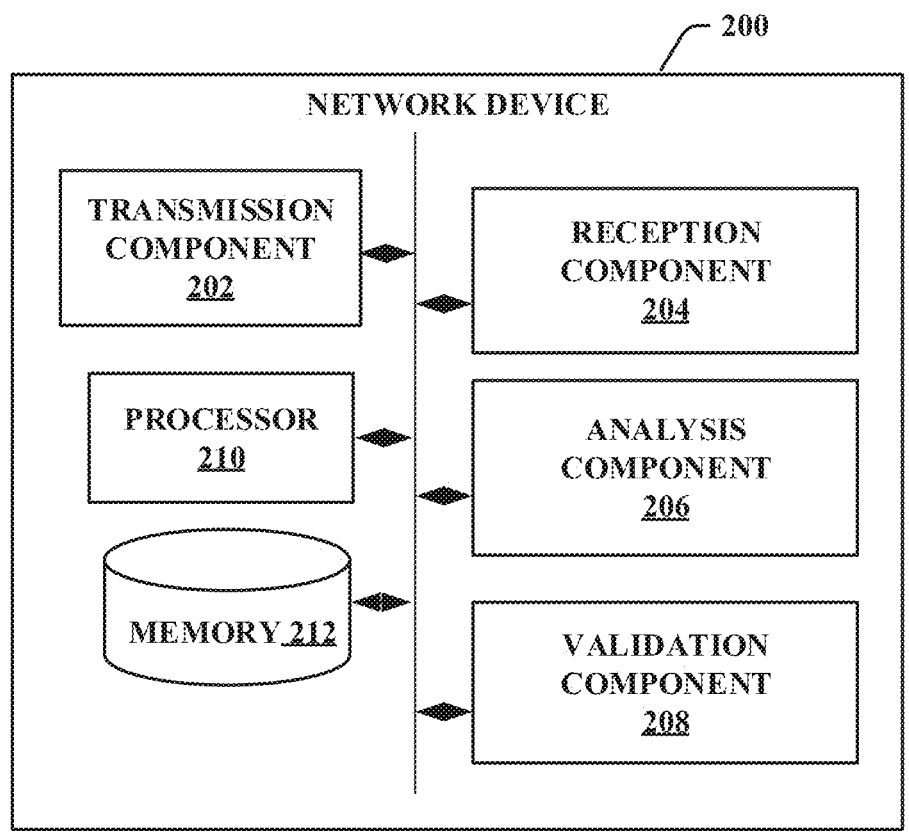
FIG. 2 illustrates an example schematic system block diagram of network device 200 according to one or more embodiments.

Referring now to FIG. 2, illustrated is an example schematic system block diagram of network device 200 according to one or more embodiments. The network device 200 can comprise a transmission component 202, a reception component 204, an analysis component 206, a validation component 208, a processor 210, and a memory 212, which can all be communicatively coupled. The processor 210 can correspond to a processing component from a plurality of processing components. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 210 can also include memory 212 that stores computer executable components and instructions.

The transmission component 202 can be operable to transmit radio signals to other land mobile radio devices. The reception component 204 can be operable to receive radio signals from the other land mobile radio devices. The analysis component 206 can analyze an incoming call for verification purposes. For example, if the UE 104 attempts to call the UE 102, the analysis component 206 of the network device 200 can check for the location of the UE 104 based on the SIP and/or any GPS of the UE 104. After the location information is verified, the validation component 208 can compare the location of UE 104 to the STIR/SHAKEN associated with the UE 104. If the location is not validated, then the validation component 208 can reject the call such that it never is received by the UE 102 or it can provide a user identity of the UE 102 with the information that the location is not confirmed and allow the user identity of the UE 102 to determine if the call shall be accepted or rejected. It should be noted that there are additional components and functionalities of the radio device 200 that are not included in this disclosure for the sake of brevity. However, these additional functions and components (now known and unknown) can fall within the scope and spirit of this disclosure.

Figure 3:
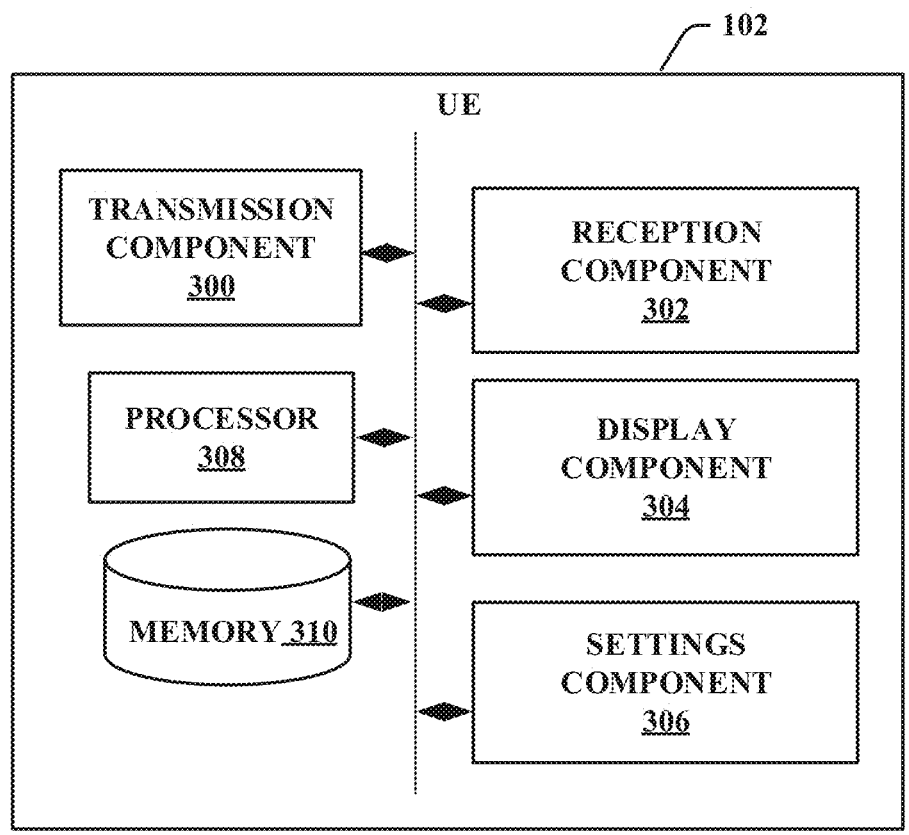
FIG. 3 illustrates an example schematic system block diagram of a user equipment according to one or more embodiments.

Referring now to FIG. 3, illustrated is an example schematic system block diagram of a user equipment 102 according to one or more embodiments. The UE 102 can comprise a transmission component 300, a reception component 302, a display component 304, a settings component 306, a processor 308, and a memory 310, which can all be communicatively coupled. The processor 308 can correspond to a processing component from a plurality of processing components. Aspects of the processor 308 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 308 can also include memory 310 that stores computer executable components and instructions. The transmission component 300 can be operable to transmit radio signals to other land mobile radio devices. The reception component 302 can be operable to receive radio signals from the other land mobile radio devices. The display component 304 can be operable to display information regarding incoming calls. For example, the display component 304 can display a rotating globe that pinpoints the location of the calling device (UE 104) to provide the user of the UE 102 with an idea of where the UE 104 may be located. The display component 304 can also display the option for a user of the UE 102 to accept, reject, send to voicemail, and/or mark as spam the incoming call from the UE 104. The settings component 306 can allow the UE 102 to modify settings associated with this disclosure. For example, the user can modify the settings of the UE 102 to automatically send potentially spam calls to voicemail. Alternatively, with regards to the calling device (e.g., UE 104), the settings of the calling device can be modified to share the location of the calling device such that the SIP and geolocation information can be confirmed by the terminating device (e.g., UE 102). It should be noted that there are additional components and functionalities of the UE device 102 that are not included in this disclosure for the sake of brevity. However, these additional functions and components (now known and unknown) can fall within the scope and spirit of this disclosure.

Figure 4:
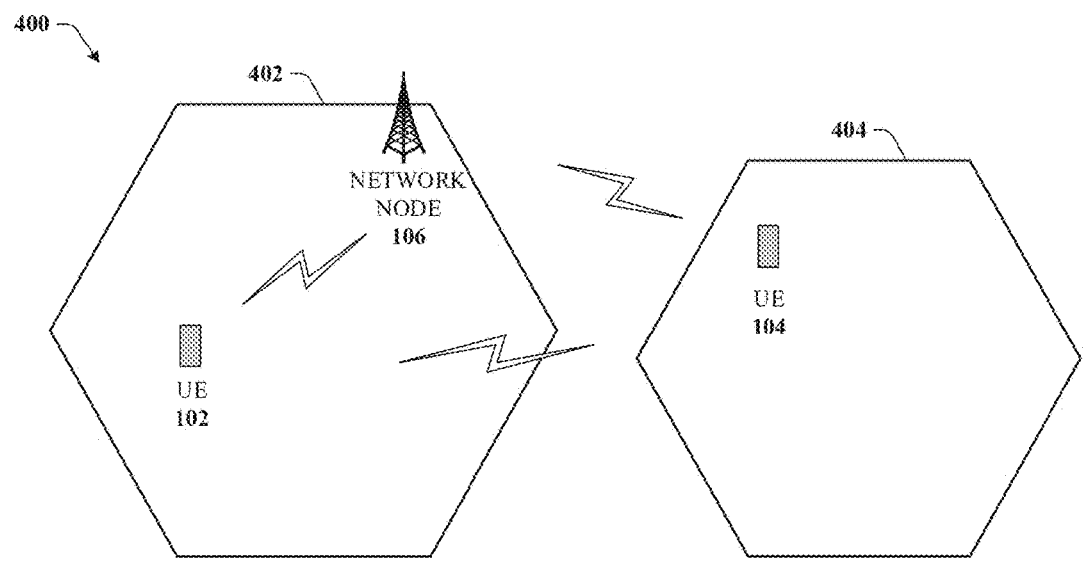
FIG. 4 illustrates an example schematic system block diagram of a call protect system according to one or more embodiments.

Referring now to FIG. 4, illustrated is an example schematic system block diagram of a call protect system 400 according to one or more embodiments. When the UE 104 initiates a call to the UE 102, the network device 200 (which can be hosted at the network node 106) can receive a wireless signal from the UE 104 via the reception component 204. The data received from the wireless signal can be analyzed by the analysis component 206 to determine a location 404 of the UE 104. For example, if the UE 104 has shared its location and its location is determined to be that of the location 404, the analysis component 206 can confirm this based on the SIP and/or the GPS of the UE 104. After the location information is verified, the validation component 208 can compare the location 404 to STIR/SHAKEN data associated with the UE 104. The comparison data can be transmitted to the UE 102 via the transmission component 202 of the network device 200. Consequently, the UE 102 can display the location of the UE 104, which can provide the user of the UE 102 with an indication of whether the call is verified or spoofed. If the user recognizes the location and the call info, then the user of UE 102 can accept the call and being communication with the UE 104. If the location is not validated, then the validation component 208 can reject the call or it can provide the user of the UE 102 with the information that the location is not confirmed and allow the user of the UE 102 to determine if the call should be accepted or rejected.

For mobile to mobile calls, a geolocation header field can be added to the in the SIP header to acquire location information as per 3GPP guidelines. Business voice over internet protocol (BVOIP) phones using the SIP interface can register the location presence using the geolocation-SIP and geolocation-http in header field. When a call is originated by these business to the voice over LTE phones, the location information can be sent to the UE 102 and can be displayed in the native dialer for 4G network and use a geolocator app on the 5G network. Consequently, a BVOIP phone picture initiating a call to a wireless customer can be displayed by UE 104.

Figure 5:
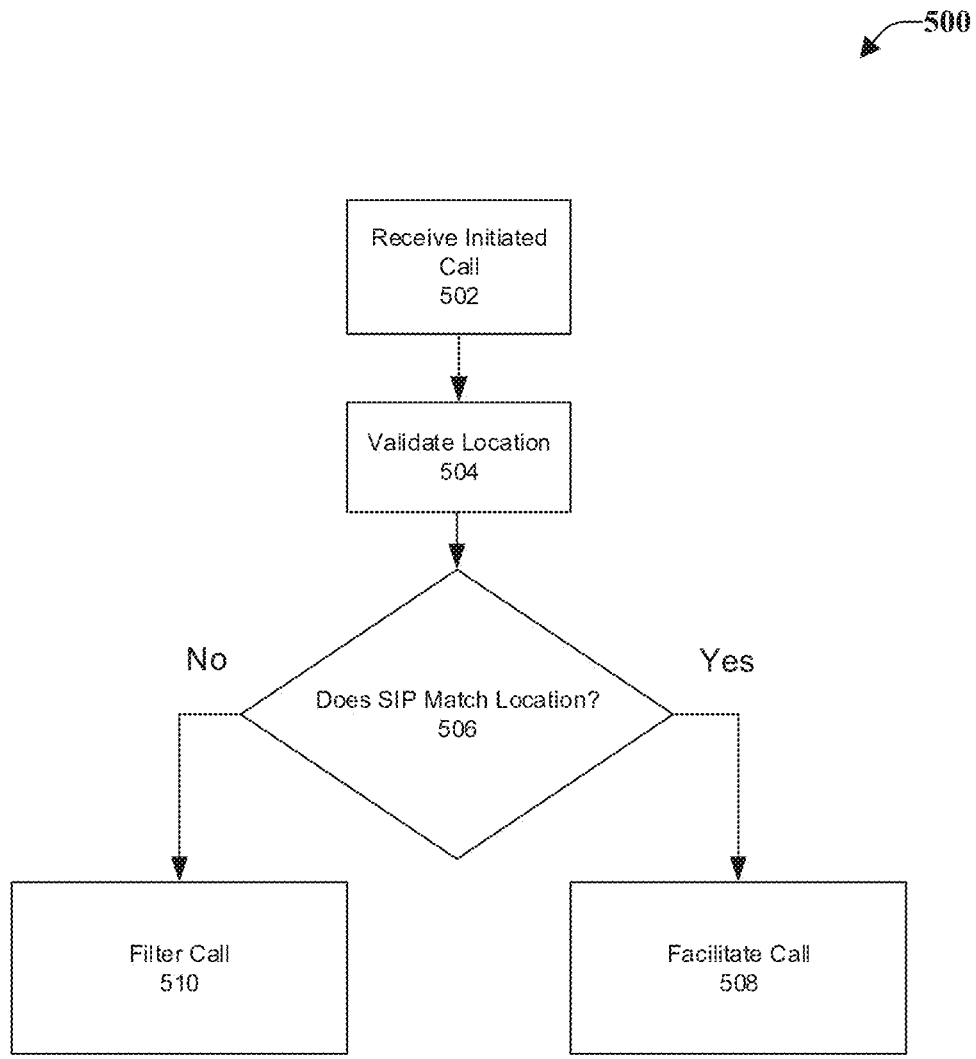
FIG. 5 illustrates an example schematic system flow diagram of a call protect system according to one or more embodiments.

Referring now to FIG. 5 illustrates an example schematic system flow diagram of a call protect system 500 according to one or more embodiments. At block 502, a UE 104 initiated call with a location request can be received (via the reception component 204) by the network device 200. The analysis component 206 can determine a location the UE 104 based on SIP and/or geolocation data at block 504. The geolocation-SIP can convey the location information of the call originator digital phone BVOIP and wireless phones. This location information can be sent in the SIP header to the called party. If the terminal number and the location match, then the location information can be displayed on the native dialer. Geolocation-http can be used to get location information that can be used if it is supported by the recipient. After the location is determined, the validation component 208 can compare the location 404 to STIR/SHAKEN data associated with the UE 104 at block 506. For example, if there is a match between the SIP/geolocation data (e.g., location information present in the SIP header field) and the SHAKEN/STIR data at block 506, then the call protect system can facilitate the call at block 508 (e.g., process the call if the location information present in the SIP header field). However, if there is not a match between the SIP/geolocation data and the SHAKEN/STIR data at block 506, then the call protect system can facilitate the call at block 510 (e.g., location information is not present or unsuitable location sent a bad request response). The filter can either conclude the call transmission or allow the user of the terminal user equipment 102 to select whether the call should be accepted or denied. Thus, the comparison data can be transmitted to the UE 102 via the transmission component 202 of the network device 200 to provide the user equipment 102 with the necessary call data.

Figure 6:
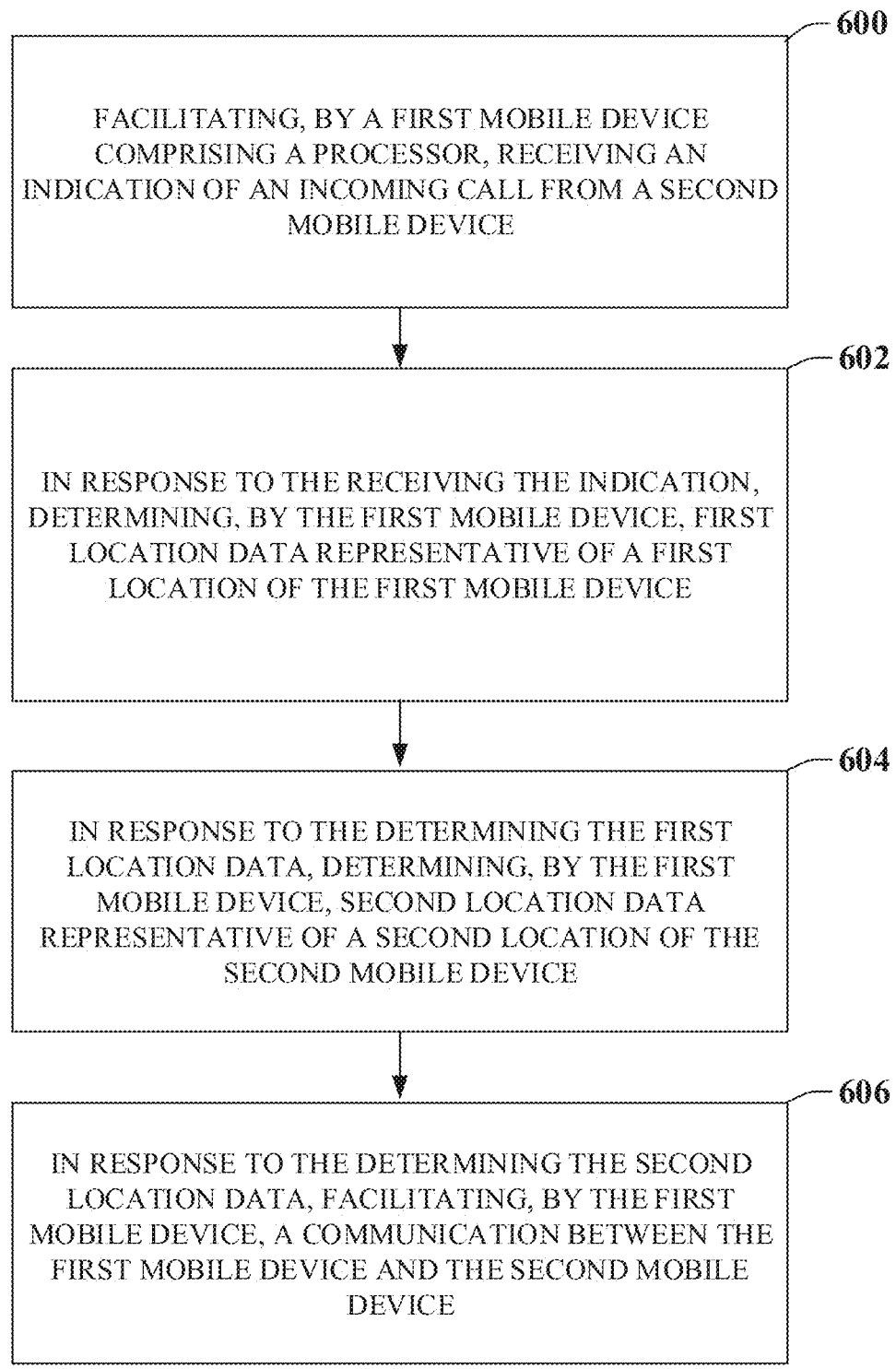
FIG. 6 illustrates an example flow diagram for a method for facilitating a call protect geolocator display for a 5G network according to one or more embodiments.

Referring now to FIG. 6, illustrated is an example flow diagram for a method for facilitating a call protect geolocator display for a 5G network according to one or more embodiments. At element 600, the method can comprise facilitating, by a first mobile device (e.g., UE 102) comprising a processor, receiving an indication of an incoming call from a second mobile device (e.g., UE 104). In response to the receiving the indication, the method can comprise determining, at element 602, by the first mobile device (e.g., UE 102), first location data representative of a first location of the first mobile device (e.g., UE 102). Additionally, at element 604, in response to the determining the first location data, the method can comprise determining, by the first mobile device (e.g., UE 102), second location data representative of a second location of the second mobile device (e.g., UE 104). Furthermore, at element 606, in response to the determining the second location data, the method can comprise facilitating, by the first mobile device (e.g., UE 102), a communication between the first mobile device (e.g., UE 102) and the second mobile device (e.g., UE 104).

Figure 7:
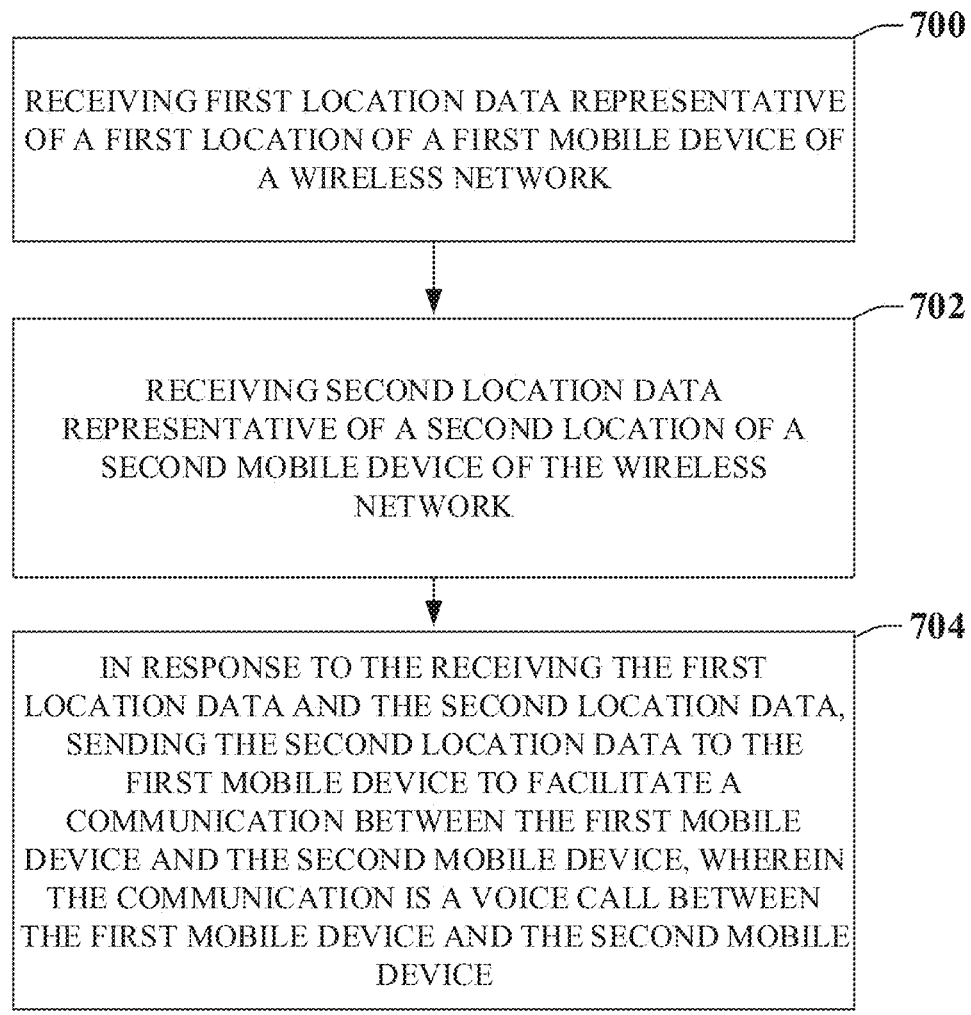
FIG. 7 illustrates an example flow diagram for a system for facilitating a call protect geolocator display for a 5G network according to one or more embodiments.

Referring now to FIG. 7, illustrated is an example flow diagram for a system for facilitating a call protect geolocator display for a 5G network according to one or more embodiments. At element 700, the system can facilitate receiving (e.g., by network device 200) first location data representative of a first location of a first mobile device (e.g., UE 102) of a wireless network. At element 702, the system can comprise receiving (e.g., by network device 200) second location data representative of a second location of a second mobile device (e.g., UE 104) of the wireless network. Furthermore, at element 704, in response to the receiving the first location data and the second location data, the system can comprise sending (e.g., by network device 200) the second location data to the first mobile device (e.g., UE 102) to facilitate a communication between the first mobile device (e.g., UE 104) and the second mobile device (e.g., UE 104), wherein the communication is a voice call between the first mobile device (e.g., UE 104) and the second mobile device (e.g., UE 104).

Figure 8:
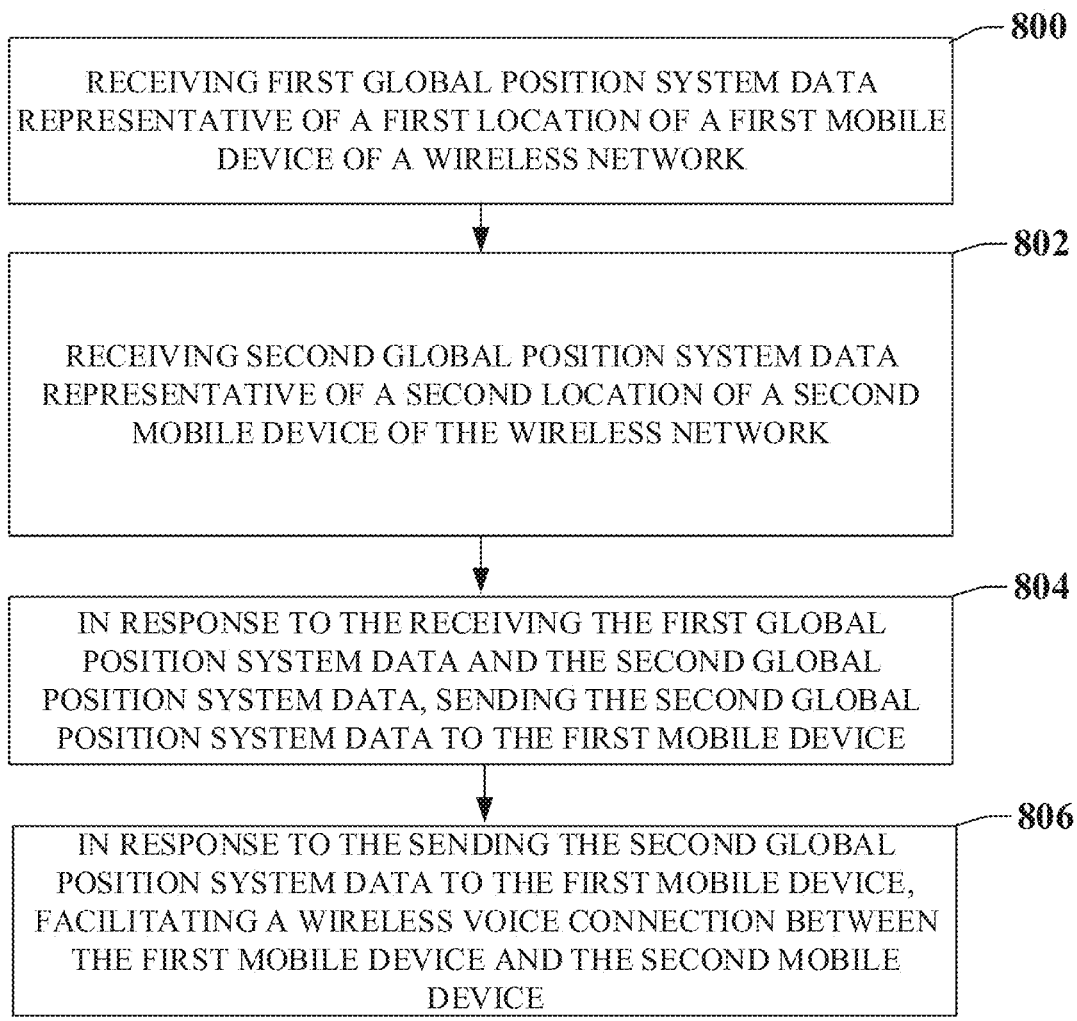
FIG. 8 illustrates an example flow diagram for a machine-readable medium for facilitating a call protect geolocator display for a 5G network according to one or more embodiments.

Referring now to FIG. 8, illustrated is an example flow diagram for a machine-readable medium for facilitating a call protect geolocator display for a 5G network according to one or more. At element 800, the machine-readable medium can perform the operations comprising receiving (e.g., by network device 200) first global position system data representative of a first location of a first mobile device (e.g., UE 102) of a wireless network. At element 802, the machine-readable medium can perform the operations comprising receiving (e.g., by network device 200) second global position system data representative of a second location of a second mobile device (e.g., UE 104) of the wireless network. In response to the receiving the first global position system data and the second global position system data, at element 804, the machine-readable medium can perform the operations comprising sending (e.g., by network device 200) the second global position system data to the first mobile device (e.g., UE 102). Additionally, at element 806, in response to the sending the second global position system data to the first mobile device (e.g., UE 102), the machine-readable medium can perform the operations comprising facilitating (e.g., by network device 200) a wireless voice connection between the first mobile device (e.g., UE 102) and the second mobile device (e.g., UE 104).

Figure 9:
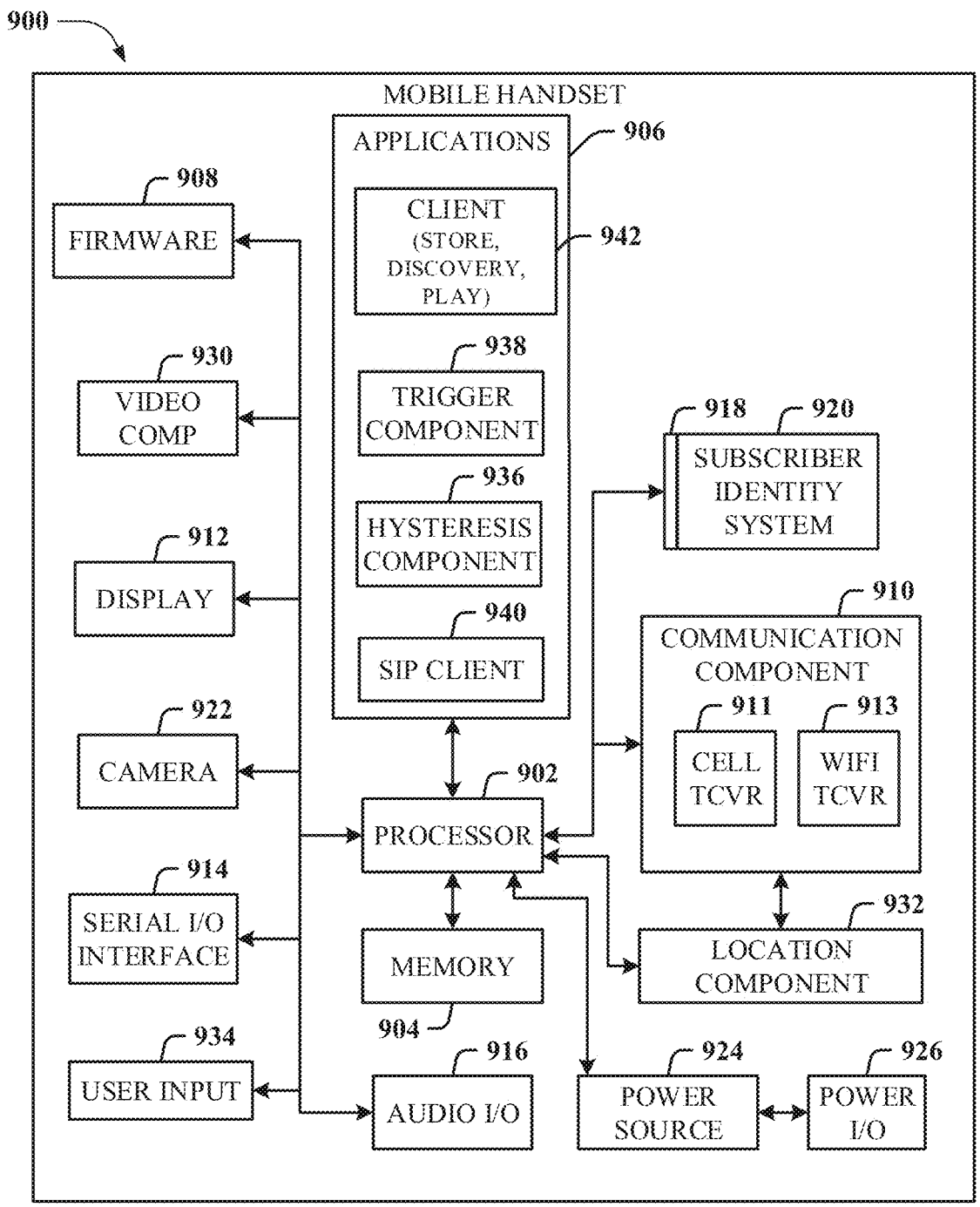
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on.

Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

In order to provide additional context for various embodiments described herein, FIG. and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 10:
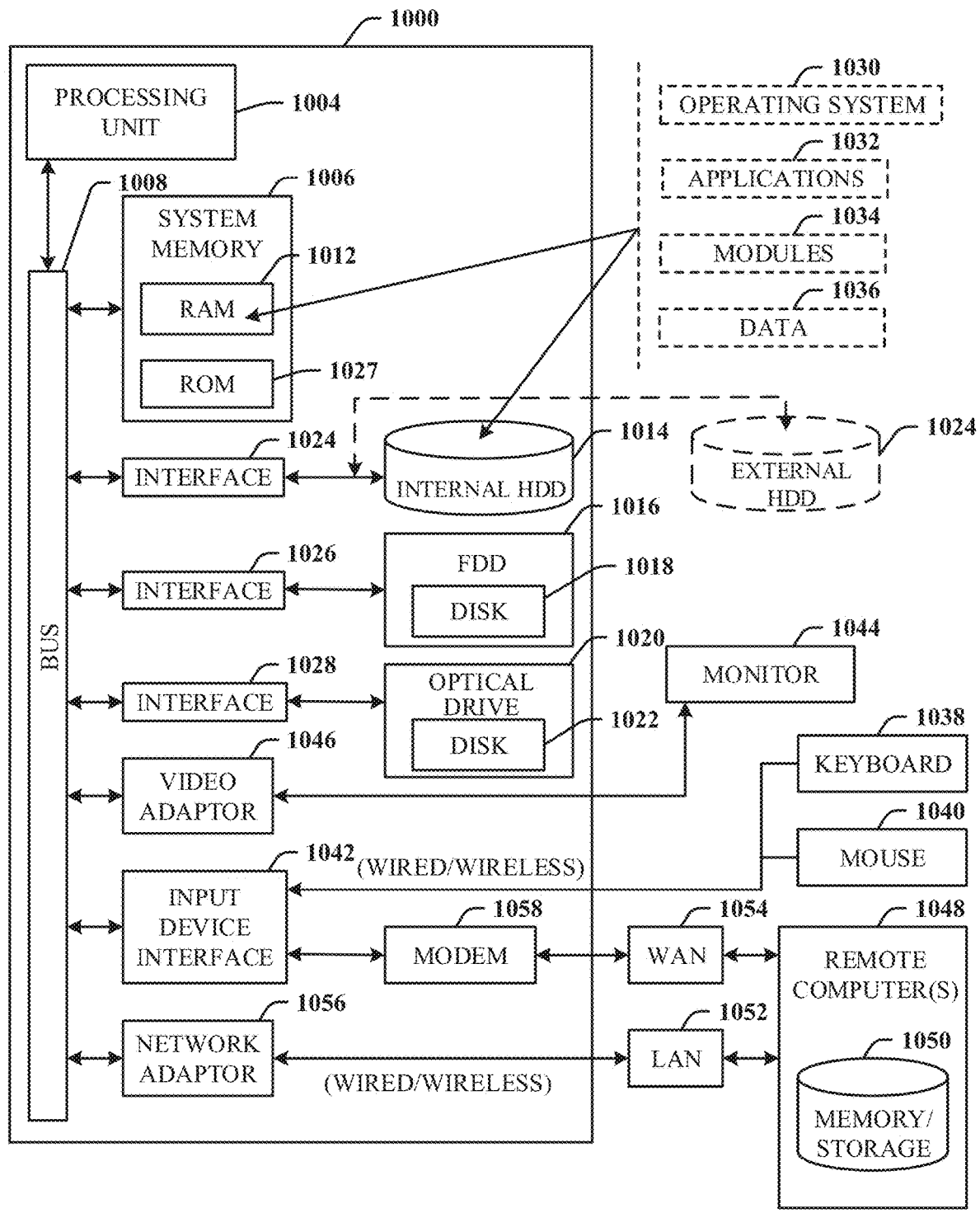
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a first user equipment comprising a processor, first location data representative of a first location of the first user equipment;
   in response to determining the first location data, determining, by the first user equipment, second location data representative of a second location of the second user equipment, wherein the second location is an accurate location of the second user equipment according to a defined accuracy criterion;
   comparing, by the first user equipment, third location data, representative of a third location of the second user equipment, to the second location data, wherein the third location data is an inaccurate location of the second user equipment according to the defined accuracy criterion;
   based on a result of comparing the third location data to the second location data, determining, by the first user equipment, that the third location is a spoofed location; and
   in response to determining that the third location is the spoofed location, blocking, by the first user equipment, a communication between the first user equipment and the second user equipment.

2. The method of claim 1, wherein determining the first location data is performed according to a session initiation protocol implemented by the first user equipment.

3. The method of claim 1, further comprising:
   displaying, by the first user equipment, the first location data via a display screen usable to render by the first user equipment.

4. The method of claim 1, wherein determining the second location data of the second user equipment is based on a global position system coordinate associated with a position of the second user equipment.

5. The method of claim 1, wherein determining the second location data is performed according to a session initiation protocol implemented by the second user equipment.

6. The method of claim 1, further comprising:
   sending, by the first user equipment to the second user equipment, the first location data representative of the first location.

7. The method of claim 6, wherein the sending comprises:
   sending the first location data in response to receiving an indication of an incoming call from the second user equipment.

8. A system, comprising:
   a processor; and
   a memory that stores executable instructions that, when executed by the processor, facilitate performance of operations, comprising:
   receiving first location data representative of a first location of a first user equipment authorized to connect via a network;
   receiving second location data representative of a second location of a second user equipment authorized to connect via the network, wherein the second location is an accurate location of the second user equipment;
   comparing third location data, representative of a third location representative of a third location of the second user equipment, to the second location data, wherein the third location is an inaccurate location of the second user equipment relative to the accurate location; and
   based on a result of comparing the third location data to the second location data, determining that the third location is a spoofed location.

9. The system of claim 8, wherein the operations further comprise:
   displaying, via a display screen of the first user equipment, an icon representative of the second location of the second user equipment.

10. The system of claim 8, wherein the second location data is generated based on a session initiation protocol implemented by network equipment that is part of the network.

11. The system of claim 8, wherein the second location data is generated based on a hypertext transfer protocol implemented by network equipment that is part of the network.

12. The system of claim 8, wherein the second location data is generated based on a hypertext transfer protocol location conveyance of a session initiation protocol implemented by network equipment that is part of the network.

13. The system of claim 8, wherein the operations further comprise:
   based on a caller identification protocol, facilitating a communication between the first user equipment and the second user equipment.

14. The system of claim 8, wherein the operations further comprise:
   in response to determining that the third location is the spoofed location, preventing a communication between the first user equipment and the second user equipment, wherein the communication is a voice call between the first user equipment and the second user equipment.

15. A non-transitory machine-readable medium, comprising executable instructions that, when executed by a processor, facilitate performance of operations, comprising:
   receiving first global positioning system data representative of a first location of a first mobile device connected via a network;
   receiving second global positioning system data representative of a second location of a second mobile device connected via the network, wherein the second location was determined according to a first precision;
   comparing third location data, representative of a third location of the second mobile device, to the second location data, resulting in a comparison output, wherein the third location was determined according to a second precision that is less precise than the second location determined according to the first precision;
   based on the comparison output, determining that the third location is a spoofed location; and
   in response to sending the second global positioning system data to the first mobile device, blocking a voice connection between the first mobile device and the second mobile device.

16. The non-transitory machine-readable medium of claim 15, wherein the operations further comprise:

in response to receiving the first global positioning system data and the second global positioning system data, sending the second global positioning system data to the first mobile device.

17. The non-transitory machine-readable medium of claim 15, wherein the operations further comprise:
in response to sending second global positioning system data to the first mobile device, facilitating displaying a representation of the second location of the second mobile device via a display screen of the first mobile device.

18. The non-transitory machine-readable medium of claim 15, wherein receiving the second global positioning system data is based on a session initiation protocol of the second mobile device associated with the network.

19. The non-transitory machine-readable medium of claim 15, wherein the connection is a first connection, and wherein the operations further comprise:
based on third global positioning system data representative of a third location of a third mobile device connected via the network, blocking a second connection between the first mobile device and the third mobile device.

20. The non-transitory machine-readable medium of claim 15, wherein blocking the voice connection comprises utilization of a signature-based handling protocol.

* * * * *